United States Patent [19]
Mailliet et al.

[11] Patent Number: 5,101,853
[45] Date of Patent: Apr. 7, 1992

[54] DEVICE FOR SHUTTING OF PIPELINES FOR TRANSPORT OF BULK PRODUCTS

[75] Inventors: Pierre Mailliet, Howald; Henri Radoux, Bereldange; Leon Ulveling; Jeannot Loutsch, both of Howald; Emile Lonardi, Bascharage, all of Luxembourg

[73] Assignee: Paul Wurth S.A., Luxembourg

[21] Appl. No.: 489,351

[22] Filed: Feb. 28, 1990

[30] Foreign Application Priority Data

Mar. 6, 1989 [LU] Luxembourg .......................... 87467

[51] Int. Cl.$^5$ .......................... F16K 1/20; F16K 3/10; F16K 25/00
[52] U.S. Cl. .......................... 137/242; 251/58; 251/159; 251/172; 251/301; 251/303; 251/63.5
[58] Field of Search .................. 137/242; 251/159, 172, 251/173, 174, 175, 315, 228, 298, 300, 301, 58, 63.5, 63.6, 229, 303

[56] References Cited

U.S. PATENT DOCUMENTS

| | | | |
|---|---|---|---|
| 2,654,924 | 10/1953 | Wood et al. | 251/172 |
| 2,883,147 | 4/1959 | Mirza et al. | 251/172 |
| 3,181,834 | 5/1965 | Jennings et al. | 251/174 |
| 3,219,047 | 11/1965 | Kircher, III et al. | 251/174 |
| 3,266,769 | 8/1966 | Shand | 251/174 |
| 3,528,448 | 9/1970 | Urban | 137/242 |
| 3,565,392 | 2/1971 | Bryant et al. | 251/172 |
| 3,901,474 | 8/1975 | Kubota | 251/159 |
| 3,912,220 | 10/1975 | Vasicek et al. | 251/172 |
| 4,137,935 | 2/1979 | Snowdon | 137/242 |
| 4,195,655 | 4/1980 | Augsburger et al. | 251/172 |
| 4,215,722 | 8/1980 | Sigmon | 251/172 |
| 4,226,258 | 10/1980 | Nakanishi | 251/172 |
| 4,262,688 | 4/1981 | Bialkowski | 137/242 |
| 4,519,579 | 5/1985 | Brestel et al. | 251/172 |

FOREIGN PATENT DOCUMENTS

| | | | |
|---|---|---|---|
| 2814188 | 10/1979 | Fed. Rep. of Germany | 251/159 |
| 33208908 | 9/1983 | Fed. Rep. of Germany . | |
| 13544609 | 4/1987 | Fed. Rep. of Germany . | |
| 22218517 | 9/1974 | France . | |
| 0054772 | 4/1980 | Japan | 251/159 |
| 0069366 | 5/1980 | Japan | 251/159 |

OTHER PUBLICATIONS

Patent Abstract of Japan, vol. 9, No. 132 (M-385) [1855], Jun. 7, 1985.

Primary Examiner—George L. Walton
Attorney, Agent, or Firm—Fishman, Dionne & Cantor

[57] ABSTRACT

The device comprises a housing with a circular passage orifice, a pivoting closing element in the form of a spherical dome and a circular gasket surrounding the said orifice and mounted on an annular support axially displacable towards the closing element under the action of a pneumatic fluid, the said annular support possessing for this purpose a passive annular surface exposed to the pressure in the said housing, the active surface of the support being larger than its passive surface.

13 Claims, 5 Drawing Sheets

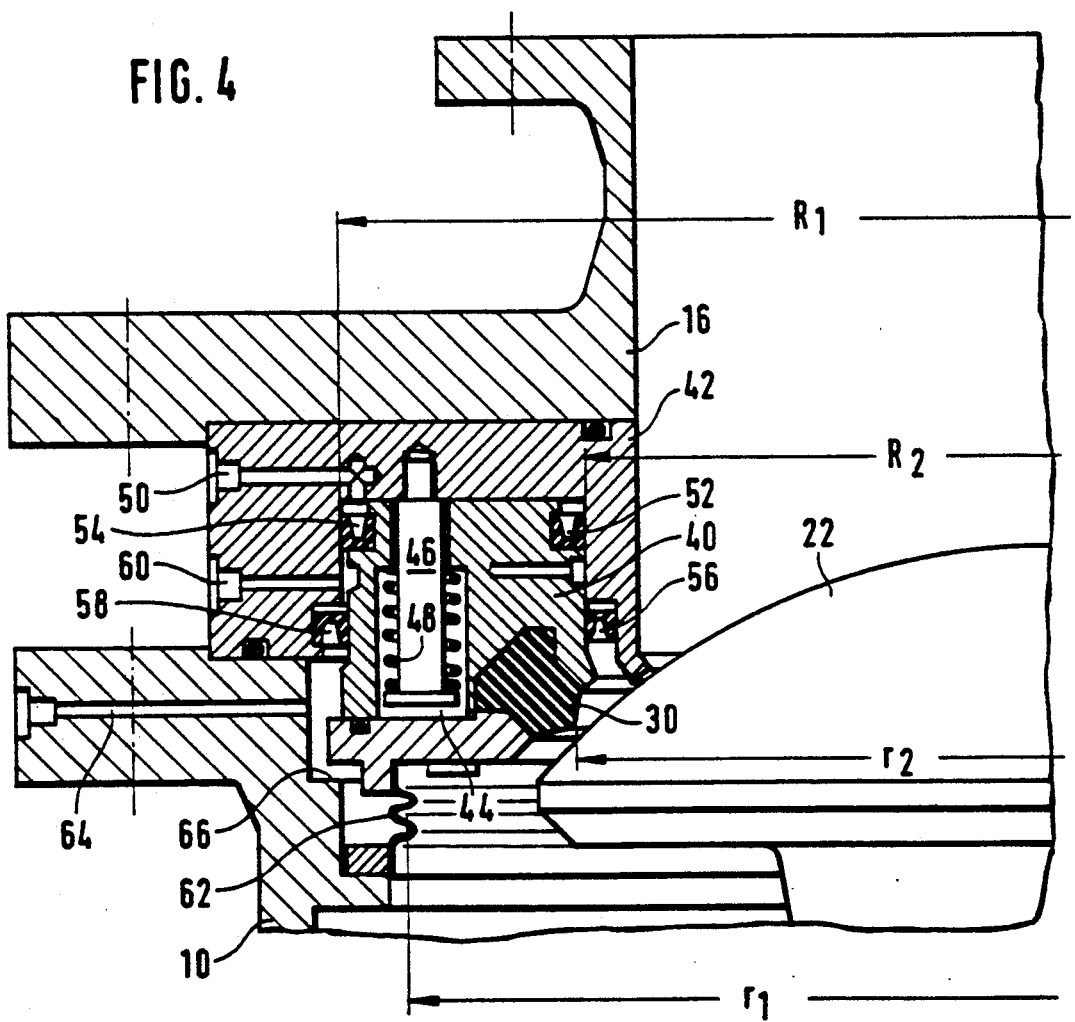

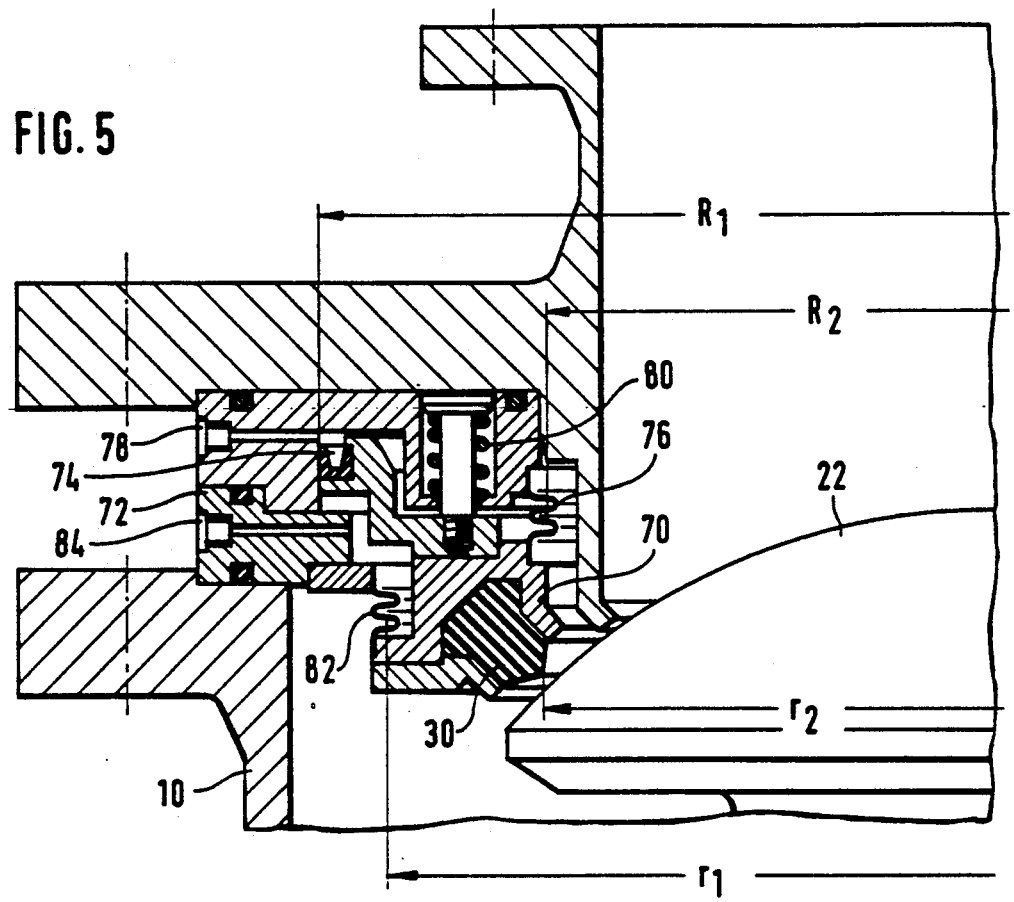

DEVICE FOR SHUTTING OF PIPELINES FOR TRANSPORT OF BULK PRODUCTS

TECHNICAL FIELD

The present invention relates to a device for shutting off pipelines for the transport of bulk products.

BACKGROUND OF THE INVENTION

A shutoff device of this type is known from the document DE-A1-3,544,609. In this known device, the annular pneumatic jack is delimited radially by an internal concertina compensator and an external concertina compensator. The gasket is laid onto the closing element by putting the pneumatic jack under pressure, the displacement of the gasket being made possible by the expansion of the corrugations of the two compensators. For displacement in the opposite direction, the pneumatic jack is ventilated, and the natural elasticity of the corrugations of the compensator is utilized in order to lift the gasket from the closing element. Now because spring functions are assigned to the compensator, this not being its primary purpose, it is necessary to bear in mind that, in contrast to a spring, a compensator cannot be prestressed, and therefore a certain number of corrugations is needed to obtain the desired displacement, thereby increasing the height of the annular pneumatic jack.

These devices, used particularly in pneumatic systems for the transport of, for example, coal dust, must be capable of withstanding the pressure both upstream and downstream of the closing element. In the known device, that surface of the gasket support which is exposed to the pressure in the housing corresponds substantially to the annular surface undergoing the action of the pneumatic fluid, especially in the event of wear of the gaskets. To make it possible to ensure effective closing against the pressure inside the housing, the pressure of the pneumatic fluid must be substantially higher than the pressure of the pneumatic transport system, the more so because the pull of the compensator occurring in the opposite direction has to be overcome. In other words, the known device does not allow the use of the main pressurization station of the transport system in order to actuate the pneumatic jack, this being because a higher pressure is needed. A separate compressor is therefore required to actuate the pneumatic jack.

SUMMARY OF THE INVENTION

The object of the present invention is to provide a improved shutoff device which does not have the above-described disadvantages of the known device.

To achieve this object, the present invention provides a shutoff device of the type described in the pre-characterizing clause, which is characterized essentially in that the active surface of the annular support is larger than its passive surface. As a result of this, the force exerted by the pneumatic fluid on the support for the purpose of a sealing closure is always higher than the force exerted in the opposite direction, generated by the pressure inside the housing and tending to left the gasket from the closing element. The advantage of this is that the pressure of the pneumatic transport system can be utilized in order to actuate the pneumatic jack. There is therefore no need to have a more powerful separate compressor.

According to a first advantageous embodiment, the gasket support is subjected to the action of a spring which exerts its effects in the opposite direction to that of the pneumatic fluid. The advantage of using a spring instead of a compensator in order to lift the gasket from the closing element is that it allows a substantial reduction of the height of the annular pneumatic jack.

The gasket support can be mounted in an annular receptacle surrounding the passage orifice, by means of an inner gasket and an outer gasket containing the pressure of the pneumatic fluid and an inner gasket and an outer gasket containing the pressure in the housing.

All four gaskets preferably have a U-shaped cross-section opening under the effect of the pressure which they undergo, while the space between the two inner gaskets and that between the two outer gaskets are connected to the atmosphere.

According to a first embodiment, the passive annular surface of the support is delimited internally by the gasket and externally by a concertina compensator which connects the support to the wall of the housing. This compensator does not perform the function of a spring, but serves merely for delimiting, together with the support and the wall of the housing, a chamber which is connected to the atmosphere and which reduces the passive surface of the support.

The wall of the housing possesses, preferably in the said chamber, a radial shoulder which forms an abutment for the said support.

According to another embodiment, the support is fixed to a pneumatic annular piston sliding axially in an annular pneumatic chamber, to which the support is connected by means of an internal concertina compensator and by means of an external concertina compensator, while the two opposite surfaces of the piston can be connected alternately to the same pneumatic fluid source in order to displace the gasket either towards the closing element or in the opposite direction. In other words, these embodiment makes use of the pressure of the pneumatic fluid both to lay the gasket onto the closing element and to lift it from this. There is therefore no need to provide a spring in order to left the gasket.

The lateral sealing of the piston isolating the two opposite surfaces of the piston from one another can be obtained by means of annular gaskets or concertina compensators.

In each of the embodiments, the edge of the passage orifice for the bulk materials is preferably designed in the form of a scraper.

BRIEF DESCRIPTION OF THE DRAWINGS

Other particular features and characteristics of the invention will emerge from the detailed description of some advantageous embodiments given below by way of illustration, with reference to the accompanying drawings in which:

FIG. 4 shows diagrammatically a partial view in axial section of a first embodiment of a shutoff device;

FIG. 5 shows a similar view of a second embodiment;

FIG. 6 shows a similar view of a third embodiment;

DETAILED DESCRIPTION OF THE DRAWINGS

Figure 1:
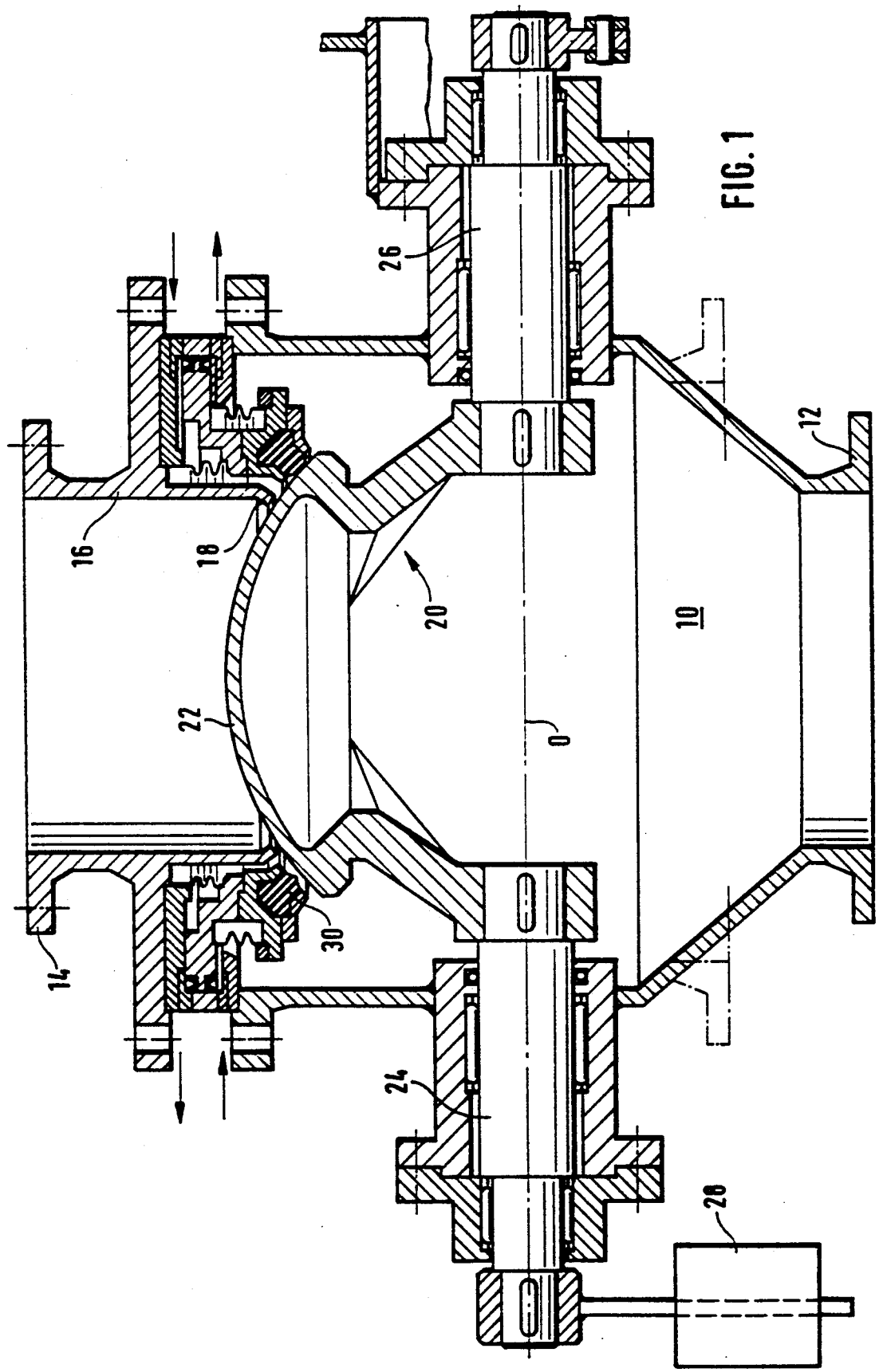
FIG. 1 shows a general diagrammatic view in axial section of a shutoff device according to the present invention.

The device illustrated in FIG. 1 comprises a housing 10 equipped with two opposite flanges 12, 14 in order to be connected to a pipeline for the flow-off of bulk products, for example, coal dust. The upper part of the housing 10 is designed in the form of a pipe connection 16 terminating in a circular passage edge 18, with which a closing element 20 interacts. This closing element 20 comprises a spherical dome 22 carried by two shafts 24, 26 which are seated and supported in mutually opposite bearings of the housing 10, so as to allow the closing element 20 to pivot about its horizontal axis 0 or between the closed position according to FIG. 1 and an open position offset at 90°.

One of the supporting shafts, for example the shaft 26, is subjected, outside the housing 10, to a drive mechanism in order to pivot the closing element 22, while the other shaft 24 carries, outside the housing 10, a weight 28 which is heavier than the weight of the closing element 22, to ensure that the latter assumes a stable state in the closed position if the drive means break down.

Sealing is obtained by means of an annular gasket 30 seated in a suitable annular support round the pipe connection 16. To ensure sealing and at the same time allow the dome 22 to pivot, this gasket 30 is axially displaceable by means described in more detail later. Although the same gasket 30 is shown on the left and right of the vertical axis in FIG. 1, for the sake of illustration the left part has been shown in the raised position, while the right part has been shown in the lowered position laid sealingly on the peripheral part of the dome 22.

The edge of the passage orifice 18 is preferably designed in the form of a scraper, in order, when the dome 22 is being opened, to prevent the particles remaining attached to it from being scraped by gasket 30.

Figure 3:
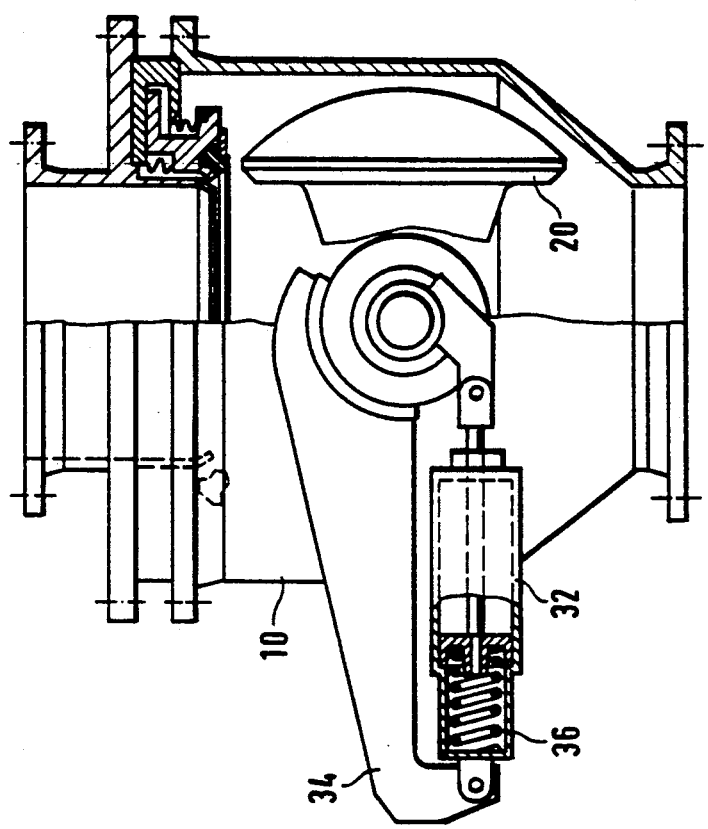
FIGS. 2 and 3 each show a partially sectional diagrammatic side view demonstrating the closing element in the closed position and in the open position respectively.
Figure 2:
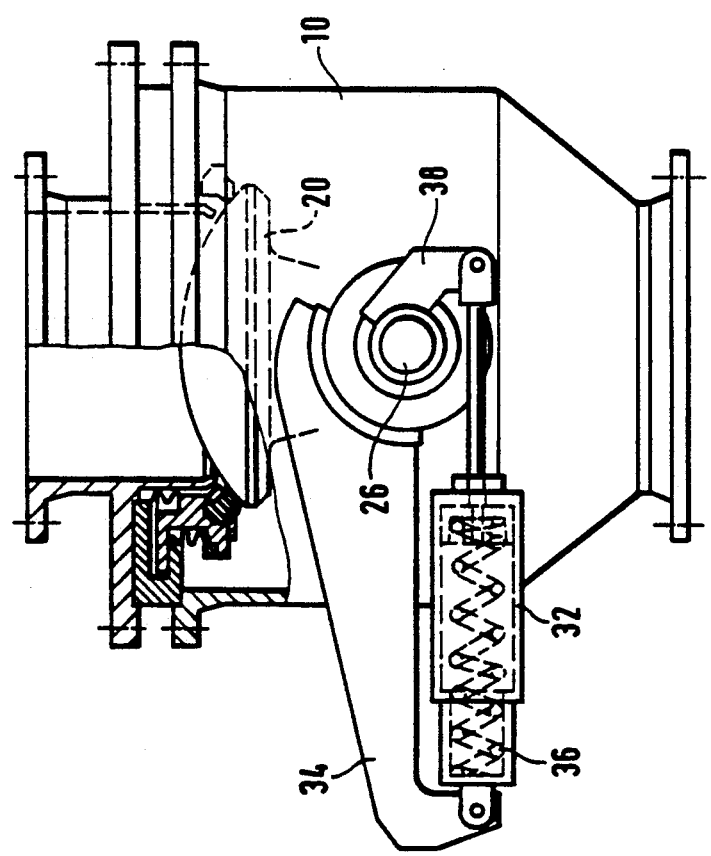

FIGS. 2 and 3 illustrate diagrammatically the mechanism for actuating the shutoff device 20. This mechanism comprises a jack 32 or other drive means which is mounted between a bracket 34 fixed to the housing 10 and an arm 38 fastened to the shaft 26. As emerges from the figures, the closing of the shutoff device 20, that is to say the pivoting of the dome 22 from the position of FIG. 3 towards the position of FIG. 2, is obtained by extending the piston rod from the cylinder of the jack 32, opening being obtained by means of the reverse operation.

As shown in the Figures, a helical spring is provided inside the jack 32, and the action of this spring 36 contributes to closing the shutoff device and opposes its opening. This spring 36 is provided in association with or as a replacement for the weight 28 of FIG. 1, and its power, if appropriate associated with that of the weight 28, is sufficient to close the shutoff device in the event of the failure of the jack 32.

Some embodiments making it possible to obtain the axial displacement of the gasket 30 in relation to the dome 22 of the shutoff device 20 will now be described. In the first embodiment according to FIG. 4, the gasket 30 is fastened in an annular support 40 of substantially rectangular cross-section, which is mounted slidably in an annular receptacle 42 surrounding the pipe connection 16. This receptacle 42 has a form matched to that of the support 40, in this particular case a cross-section in the form of an inverted "U" capable of receiving the support 40.

Furthermore, the support 40 possesses a cavity 44, in which extends a rod 46 round which is arranged a helical spring 48, the action of which tends to lift the support 40 and keep it on the bottom of its receptacle 42. It has been possible to show only one pair of rods 46 and springs 48 in the figure, but it is clear that several pairs of rods and springs are provided in the support 40 round the pipe connection 16.

The upper annular surface of the support 40 can be subjected to the pressure of a pneumatic fluid via a duct 50 extending through the receptacle 42. Pressurization tends to lower the support 40 counter to the action of the spring 48, so as to lay the gasket 30 onto the dome 22. The sealing for exerting this pneumatic pressure is obtained by means of an inner annular gasket 52 and an outer annular gasket 54.

To seal the device against the pressure prevailing inside the housing 10, the support 40 is likewise surrounded by an inner lower gasket 56 and an outer lower gasket 58.

The four gaskets 52, 54, 56 and 58 preferably have a "V"-shaped or "U"-shaped cross-section, as shown in the figure, so as to open under the action of the pressure which they undergo. For the same reason, the support 40 possesses, between the two inner gaskets 52, 56 and between the two outer gaskets 54 and 58*j*, grooves which are connected to the atmosphere via a duct 60 of the receptacle 42 in order to contribute to the sealing of these gaskets.

The force with which the gasket 30 is laid onto the dome 22 under the action of the pressure of the pneumatic fluid is proportional to the active annular surface of the support 40 defined by the radii $R_1$ and $R_2$ illustrated in the figure.

The lower surface of the support 40 undergoes the influence of the pressure inside the housing and consequently generates a force in the opening direction, that is to say a lifting of the gasket 30 from the dome 22. So that there is no need to use a pressure of the pneumatic fluid higher than the pressure in the transport system in order to guarantee that the gasket 30 is kept in its closed position, according to another aspect of the present invention that passive surface of the support 40 which is exposed to the pressure inside the housing 10 is reduced. For this purpose, the support 40 is connected to the wall of the housing 10 by means of sealing compensator 62, thereby reducing the surface acted on by the pressure inside the housing to the annular surface defined by the difference between the radii $r_1$ and $r_2$ shown in FIG. 2. On the assumption that $r_2$ corresponds substantially to $R_2$, the effective force acting on the support 40 in the direction of closing of the gasket 30 is proportional to the annular surface defined by the radii $R_1$ and $r_1$.

To prevent an accumulation of pressure opposing the action of the pneumatic fluid from occurring in the space defined between the compensator 62, the wall of the housing 10 and the support 40, this space is connected to the atmosphere via a duct 64. However, the same result could be obtained by omitting the gasket 58.

In this space, the wall of the housing 10 has an inner radial shoulder 66 which forms an abutment limiting the lowering movement of the support 40 under the action of the pneumatic fluid.

FIG. 5 shows an alternative version of the embodiment of FIG. 4, which functions in the same way, but the arrangement of which allows a slight reduction of the height of the device. In this embodiment, the gasket 30 is likewise fastened in an annular support 70 which is guided axially in annular receptable 72 solely by means of its peripheral part via an outer gasket 74. The two inner gaskets 52 and 56 of FIG. 4 have been omitted and replaced by a compensator 76 which connects the support 70 to the receptacle 72 and which ensures the sealing of the pressure of the pneumatic fluid conveyed via the duct 78. The spring 80 making it possible to lift the gasket 30 from the dome 22 is provided in the mass of the receptacle 72, rather than in the support 40, as in the embodiment of FIG. 4. The support 70 is likewise connected to the receptacle 72 by means of a compensator 82 external to the wall of the housing 10, and the space delimited by this compensator 82 and the support 70 is likewise connected to the atmosphere via a duct 84, in order to allow the variations in volume attributable to the movements of the support.

The active surface of the support undergoing the action of the pressure of the pneumatic fluid is delimited by the radii $R_1$ and $R_2$, and this surface is larger than the passive surface defined by the radii $r_1$ and $r_2$ and undergoing the action of the pressure in the housing.

In the embodiment of FIG. 6, the gasket 30 is likewise fastened in an annular support 90 which, this time, is fixed to an annular piston 92 axially displaceable in an annular receptacle 94 of rectangular cross-section. The sealing of the piston 92 against the pressure of the pneumatic fluid introduced at 96 is obtained by means of an outer gasket 98 and an inner gasket 100. As in the embodiment of FIG. 5, the support 90 is connected sealingly to the receptacle 94 by means of an internal compensator 102 and an external compensator 104, of which the respective mean radii $r_2$ and $r_1$ define the passive surface undergoing the action of the pressure in the housing 10.

Contrary to the preceding embodiment, the lifting of the gasket 30 is no longer obtained by means of a spring, but pneumatically. For this purpose, the space delimited by the external compensator 104, the support 90, part of the lower face of the piston 92 and part of the receptacle 94 is connected at 106 to the pressure of the pneumatic fluid, an annular gasket 108 round the piston 92 ensuring sealing between the latter and the receptacle 94. By means of a valve (not shown), the pressure of the pneumatic fluid can therefore by applied either at 96 or at 106, with the simultaneous connection to the atmosphere of that duct 96 or 106 which is not connected to the pneumatic pressure. If the pneumatic pressure is at 96, the gasket 30 is laid onto the dome 22, while if the pressure is at 106 the piston 92 is lifted and frees the gasket 30 from the dome 22.

The space delimited by the internal compensator 102 is connected to the atmosphere via suitable ducts in the receptacle 94, in order to allow variations of volume.

Figure 7:
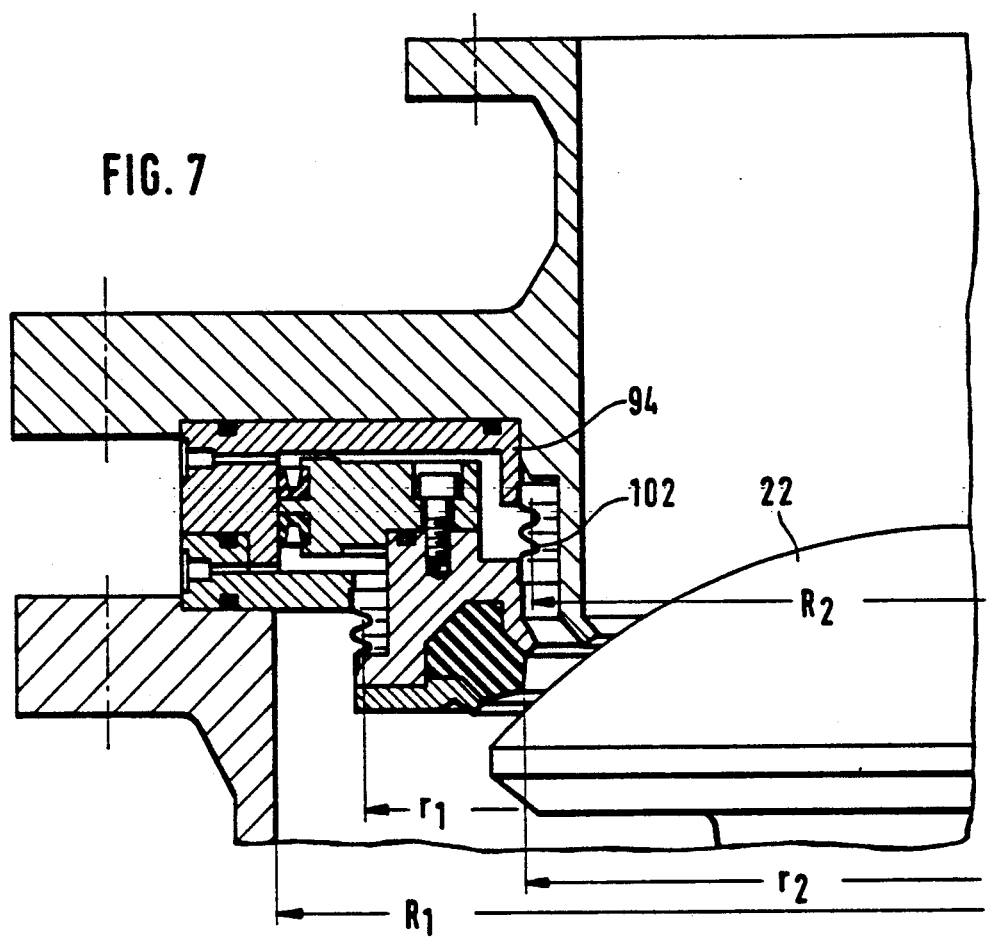
FIG. 7 shows a similar view of a fourth embodiment.

FIG. 7 illustrates an alternative version of the embodiment of FIG. 6. The only difference is that the inner gasket 100 of the embodiment of FIG. 6 is omitted. The piston 92 is guided in the receptacle 94 by means of its peripheral region only. The effect of omitting this gasket is that the upper active surface of the piston 92 now extends as far as the internal compensator 102 whose radius is $R_2$.

Figure 8:
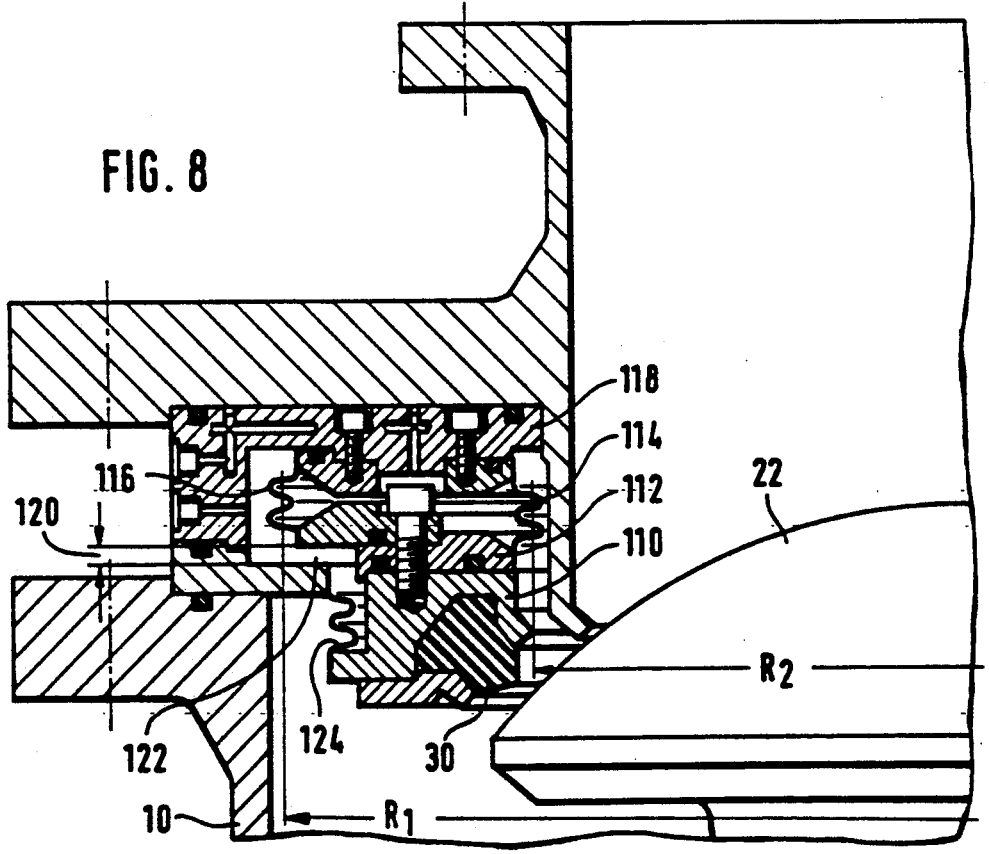
FIG. 8 shows a similar view of the fifth embodiment.

FIG. 8 illustrates an embodiment which functions in the same way as the embodiments of FIGS. 6 and 7, but in which all the gaskets have been replaced by compensators.

The support 110 of the gasket 30 is fixed to a piston 112 which is suspended on an annular mount 118 by means of an internal compensator 114 and an external compensator 116. The pneumatic pressure is therefore applied either in the space delimited internally by the compensators 114 and 116 above the piston 112, for the purpose of the laying the gasket 30 onto the dome 22, or in the annular space 122 on the outside of the gasket 116 and the support 110 and on the inside of the compensator 124, for the purpose of acting on the lower peripheral surface of the piston 110 in order to lift the gasket 30 from the dome 22.

The active surface of the jack available for closing the gasket 30 is that delimited by the means radii of the compensators 114 and 116, designated respectively by $R_2$ and $R_1$ in the figure, this surface being substantially larger than that delimited by $r_2$ and $r_1$ and undergoing the action of the pressure in the housing 10.

In each of the embodiments of FIGS. 5 to 8, the lowering of the gasket support is limited in the same way as the limitation formed by the abutment 66 of FIG. 4, to prevent the gasket 30 from being crushed against the dome 22 if the housing is ventilated downstream of the gasket 30.

While preferred embodiments have been shown and described, various modification and substitutions may be made thereto without departing from the spirit and scope of the invention. Accordingly, it is to be understood that the present invention has been described by way of illustrations and not limitations.

What is claimed is:

1. A device for shutting off pipelines for the transport of a pressurized stream of lignite dust or coal dust, comprising:

a housing having a circular orifice;

closing means for closing said orifice, said closing means comprising a spherical dome pivotably mounted within said housing and having a first position wherein the dome is disposed across the orifice, and an open position wherein the dome is pivotably displaced from the first position;

means for pivoting said closing means;

an annular receptable defined within said housing and surrounding said orifice;

an annular support mounted around said orifice, a first portion of said annular support being slidably received within the annular receptacle and axially displaceable toward said closing means, said annular support including an inner radial surface, an outer radial surface, a first annular surface, said first annular surface being exposed to the product stream pressure, and a second annular surface, said second annular surface being larger than said first annular surface;

an inner concertina compensator sealingly connecting said inner radial surface of the support and the receptacle;

an outer concertina compensator sealingly connecting said outer radial surface of the support and the receptacle;

first gasket means mounted on a second portion of said annular support, said second portion being disposed exteriorly of said annular receptacle, for contacting the closing means to seal the orifice; and pneumatic means for axially displacing said annular support by subjecting the second annular surface of the annular support to pressurized pneumatic fluid in order to apply the first gasket means on the closing means.

2. The device of claim 1, further comprising:

resilient means for opposing said pneumatic means.

3. The device of claim 2, further comprising:
outer annular gasket means, sealingly disposed between said outer radial surface of said support and said receptacle, for containing the pneumatic fluid.

4. The device of claim 3, wherein
a first space is defined between the outer annular gasket means and the outer compensator;
a second space is defined between the outer annular gasket means and the inner compensator; and
the first space is vented to the atmosphere.

5. The device of claim 1, wherein the pneumatic means comprises:
an annular piston secured to said second surface of said annular support and slidably received within the annular receptacle, said piston having opposed first and second sides;
fluid supply means for applying pressurized fluid to said piston to axially displace said piston relative to said housing, wherein fluid may be applied to the first side of the piston to urge the piston in a direction away from the housing and fluid may be applied to the second side of the piston to urge the piston in a direction toward the housing.

6. The device of claim 5, further comprising a third concertina compensator sealingly connecting the piston and the annular receptacle to isolate the first surface of the piston from the second surface of the piston.

7. The device of claim 6, wherein a first pneumatic chamber, for applying pressurized fluid to the first surface of the piston, is defined between the third compensator and the inner compensator and wherein a second pneumatic chamber, for applying pressurized fluid to the second surface of the piston, is defined between the third compensator and the outer compensator.

8. The device of claim 5, further comprising outer gasket means surrounding the piston for isolating the first surface of the piston from the second surface of the piston.

9. The device of claim 8, wherein a first pneumatic chamber for applying pressurized fluid to the first surface of the piston is defined between said outer gasket and said inner compensator and a second pneumatic chamber for applying pressurized fluid to the second side of the piston is defined between the outer gasket and the outer compensator.

10. The device of claim 12, wherein a first pneumatic chamber, for applying pressurized fluid to the first surface of the piston, is defined between the outer gasket and the inner compensator, a second pneumatic chamber, for applying pressurized fluid to the second side of the piston, is defined between the outer gasket and the outer compensator and a third chamber, said third chamber being vented to the atmosphere, is formed between the inner gasket and the inner compensator.

11. The device of claim 5, wherein the annular receptacle and the first side of the piston define a first pneumatic chamber and further comprising gasket means between the piston and the receptable for sealing the first pneumatic chamber.

12. The device of claim 11, wherein the piston includes an outer radial surface between the first and second surfaces and an inner radial surface between the first and second surfaces, further comprising:
at least one annular outer gasket, sealingly disposed between the receptacle and the outer radial surface of the piston, and at least one annular inner gasket, sealingly disposed between the receptacle and the inner annular surface of the piston.

13. The device of claim 1, further comprising:
circumferential means for scraping said dome, said circumferential means surrounding said orifice.

* * * * *